(12) United States Patent
Luo et al.

(10) Patent No.: US 9,760,551 B2
(45) Date of Patent: Sep. 12, 2017

(54) GENERATING REGULAR EXPRESSION

(71) Applicant: Alibaba Group Holding Limited, Grand Cayman (KY)

(72) Inventors: Guangchuan Luo, Hangzhou (CN); Tingtao Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 30 days.

(21) Appl. No.: 15/003,723

(22) Filed: Jan. 21, 2016

(65) Prior Publication Data

US 2016/0217121 A1  Jul. 28, 2016

(30) Foreign Application Priority Data

Jan. 22, 2015  (CN) .......................... 2015 1 0032801

(51) Int. Cl.
*G06F 17/21* (2006.01)
*G06F 17/30* (2006.01)
*G06F 17/22* (2006.01)

(52) U.S. Cl.
CPC ........ *G06F 17/2282* (2013.01); *G06F 17/211* (2013.01); *G06F 17/3043* (2013.01)

(58) Field of Classification Search
CPC ........................... G06F 17/3043; G06F 17/211
See application file for complete search history.

(56) References Cited

U.S. PATENT DOCUMENTS

| | | | |
|---|---|---|---|
| 6,785,677 B1 * | 8/2004 | Fritchman | ......... G06F 17/30477 |
| 8,261,241 B2 | 9/2012 | Gutierrez et al. | |
| 8,484,238 B2 | 7/2013 | Loeser et al. | |
| 8,843,508 B2 | 9/2014 | Thorup et al. | |
| 2002/0129005 A1 * | 9/2002 | Ojanen | ............. G06F 17/30637 |
| 2006/0167873 A1 * | 7/2006 | Degenaro | ........... G06F 9/45512 |
| 2007/0133593 A1 | 6/2007 | Shankara | |
| 2007/0214134 A1 * | 9/2007 | Haselden | .......... G06F 17/30985 |

(Continued)

FOREIGN PATENT DOCUMENTS

WO    WO2010088833    8/2010

OTHER PUBLICATIONS

PCT Search Report and Written Opinion mailed Mar. 31, 2016 for PCT Application No. PCT/US16/14372, 9 pages.

*Primary Examiner* — Samuel G Neway
(74) *Attorney, Agent, or Firm* — Lee & Hayes, PLLC

(57) ABSTRACT

An example method for generating a regular expression includes: acquiring a preset character string; acquiring a to-be-collected character string in the preset character string in response to a trigger instruction; recognizing a character string before the to-be-collected character string from the preset character string, the character string before the to-be-collected character string being used as a first character string; recognizing a character string after the to-be-collected character string from the preset character string, the character string after the to-be-collected character string being used as a second character string; and generating a regular expression of the to-be-collected character string by a first preset rule according to character features of the to-be-collected character string, the first character string and the second character string. The techniques of the present disclosure generate the regular expression of the character string needed by a user.

20 Claims, 3 Drawing Sheets

(56) References Cited

U.S. PATENT DOCUMENTS

| | | | |
|---|---|---|---|
| 2008/0071783 A1 | 3/2008 | Langmead et al. | |
| 2008/0228466 A1* | 9/2008 | Sudhakar | G06F 17/2725 704/9 |
| 2009/0070328 A1* | 3/2009 | Loeser | G06F 17/30672 |
| 2009/0083265 A1* | 3/2009 | Michailov | G06F 17/30985 |
| 2010/0306260 A1* | 12/2010 | Dejean | G06F 17/2745 707/776 |
| 2013/0031076 A1* | 1/2013 | Bhola | G06F 17/3066 707/706 |
| 2013/0282739 A1* | 10/2013 | Anderson | G06F 17/2705 707/755 |
| 2014/0019458 A1* | 1/2014 | Walton | G06F 17/3053 707/748 |
| 2014/0207792 A1 | 7/2014 | Carasso et al. | |
| 2014/0297663 A1 | 10/2014 | Urago | |
| 2016/0217121 A1* | 7/2016 | Luo | G06F 17/2282 |

* cited by examiner

GENERATING REGULAR EXPRESSION

CROSS REFERENCE TO RELATED PATENT APPLICATION

This application claims foreign priority to Chinese Patent Application No. 201510032801.0 filed on 22 Jan. 2015, entitled "Method and System for Generating Regular Expression", which is hereby incorporated by reference in its entirety.

TECHNICAL FIELD

The present disclosure relates to the technical field of computer technology, and, more particularly, to a method and system for generating a regular expression.

BACKGROUND

The concept of regular expression is a computer technology concept. The regular expression uses a single character string to describe and match a series of character strings which satisfy a certain syntactic rule. In many text editors, the regular expression is usually used for searching and replacing texts which satisfy a certain mode.

The regular expression is generated generally through a regular expression generation tool. The existing regular expression generation tool includes Txt2re. Txt2re provides a plurality of text item selection buttons. Through a certain text item selection button, Txt2re tool executes a processing corresponding to rules. Such processing usually includes extracting a partial character string with a corresponding rule from a character string, and generating a code corresponding to the regular expression through the extracted partial character string. The specific steps for generating a regular expression of a log by using Txt2re include:

S1: Txt2re tool receives an input log through a textbox. Provided that the log is:

10.200.98.220 - - [28/Jun/2013:14:53:08 +0800] "POST / PutData?Category=YunOsAccountOpLog&AccessKeyId=U0UjpekFQOVJW45A&Date=Fr i%2C%2028%20Jun%202013%2006%3A53%3A30%20GMT&Topic=raw&Signature=pD12XYLmGxKQ%2Bmkd6x7hAgQ 7b1c%3D HTTP/1.1" 0.024 18204 200 37 "-" "aliyun-sdk-java"

S2: Txt2re tool traverses each character in the input log, recognizes character strings with a certain rule in the log, and generates a regular expression mark corresponding to each character string in the log by a preset rule.

For example, Txt2re tool traverses each character in the input log. After the characters "10.200.98.220" are traversed, it is determined that this character string is an IPv4 address by the preset rule, and a regular expression mark "ip address" which represents this field is generated.

S3: Txt2re tool receives an instruction of clicking on a "show matches" button in an interface, in response to the instruction displaying the character string in the log and the corresponding regular expression mark, and provides a click command on the regular expression mark. As shown in FIG. 1, by receiving the clicked "show matches" button, Txt2re tool displays an area. In this area, the log content and the regular expression mark corresponding to the recognized character string in the log content are respectively displayed in two lines. In addition, a clickable button is provided on the regular expression mark.

S4: Txt2re tool receives and clicks on the button marked as "ip address" to process the corresponding character string "10.200.98.220" and generates a code corresponding to the regular expression of the character string.

Then, an operator may convert the code into the regular expression corresponding to the field manually or by using other tools.

Thus, Txt2re tool provides a plurality of to-be-collected character string selection buttons according to a preset rule. By clicking a selection button of a certain to-be-collected character string, Txt2re generates the regular expression corresponding to the to-be-collected character string.

There are at least the following problems in the conventional techniques:

When Txt2re tool is used to generate regular expressions in the conventional techniques, the acquirable regular expressions are limited, i.e., only regular expressions of character strings which satisfy certain rules are provided, and the regular expressions cannot be generated according to the needs of users. For example, in the above log, Txt2re tool provides the selection button corresponding to the character string including "[28/Jun/2013:14:53:08 +0800]." However, the square bracket in the character string is not of significance. So, if possible, a user generally will select the character string "28/Jun/2013:14:53:08 +0800", i.e., the user needs a regular expression of the character string without the square bracket. However, in the conventional techniques, the user is not able to select, which thus, in the conventional techniques, results in poor flexibility for generating the regular expressions, and cannot satisfy the users' needs.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The objective of the example embodiment of the present disclosure is to provide a method and system for generating a regular expression, which generates regular expressions of character strings needed by users.

In order to solve the above technical problem, the present disclosure provides methods and systems for generating the regular expression according to the example embodiment of the present disclosure.

An example method for generating a regular expression includes:

acquiring a preset character string;

acquiring a to-be-collected character string in the preset character string in response to a trigger instruction;

recognizing a character string before the to-be-collected character string from the preset character string, the character string before the to-be-collected character string being used as a first character string;

recognizing a character string after the to-be-collected character string from the preset character string, the character string after the to-be-collected character string being used as a second character string; and generating a regular expression of the to-be-collected character string by a first preset rule according to character features of the to-be-collected character string, the first character string and the second character string.

An example system for generating a regular expression includes:

a preset character string acquisition unit that acquires a preset character string;

a to-be-collected character string acquisition unit that acquires a to-be-collected character string in the preset character string in response to a trigger instruction;

a first character string acquisition unit that recognizes a character string before the to-be-collected character string from the preset character string, the character string before the to-be-collected character string being used as a first character string;

a second character string acquisition unit that recognizes a character string after the to-be-collected character string from the preset character string, the character string after the to-be-collected character string being used as a second character string; and a regular expression generation unit that generates a regular expression of the to-be-collected character string by a first preset rule according to character features of the to-be-collected character string, the first character string and the second character string.

According to the technical solutions in the example embodiments of the present disclosure, the techniques of the present disclosure acquire the to-be-collected character string in the preset character string in response to the trigger instruction according to the needs of the users, and generate the regular expression of the to-be-collected character string according to the preset rule, which, compared with the conventional techniques, improves the flexibility in usage greatly, and generates the regular expressions of the corresponding character strings according to the needs of the users to parse the character strings which are useful to the users according to the regular expressions.

BRIEF DESCRIPTION OF THE DRAWINGS

In order to explain technical solutions of the example embodiments of the present disclosure or the conventional techniques more clearly, a brief introduction of drawings that describe the example embodiments or the conventional techniques is provided below. Apparently, the drawings described below are merely some example embodiments of the present disclosure, and other drawings may be obtained according to these drawings by those skilled in the art without creative efforts.

DETAILED DESCRIPTION

The example embodiment of the present disclosure provides an example method and system for generating a regular expression.

To make the technical solutions of the present disclosure more comprehensible to those skilled in the art, the technical solutions in the example embodiments of the present disclosure are described as follows with reference to the accompanying drawings in the example embodiments of the present disclosure. Apparently, the example embodiments to be described merely represent a part and not all of the example embodiments of the present disclosure. All other example embodiments obtained by persons of ordinary skill in the art based on the example embodiments of the present disclosure without creative efforts shall belong to the protection scope of the present disclosure.

The specific implementation of the example embodiments of the present disclosure is described below in detail through several specific examples.

Figure 1:
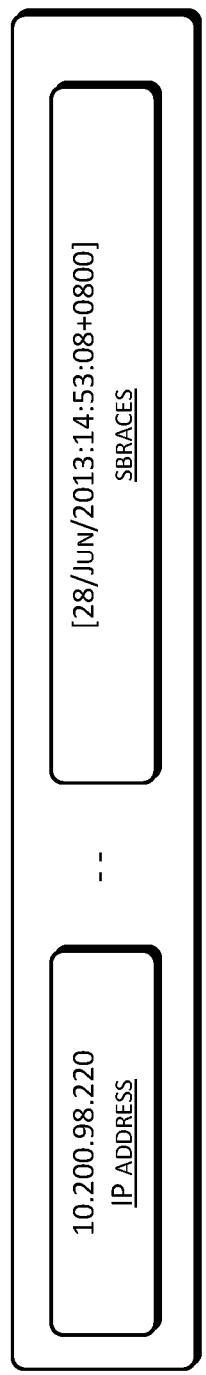
FIG. 1 is a partial schematic diagram of an example log matching by Txt2re tool in the conventional techniques.
Figure 2:
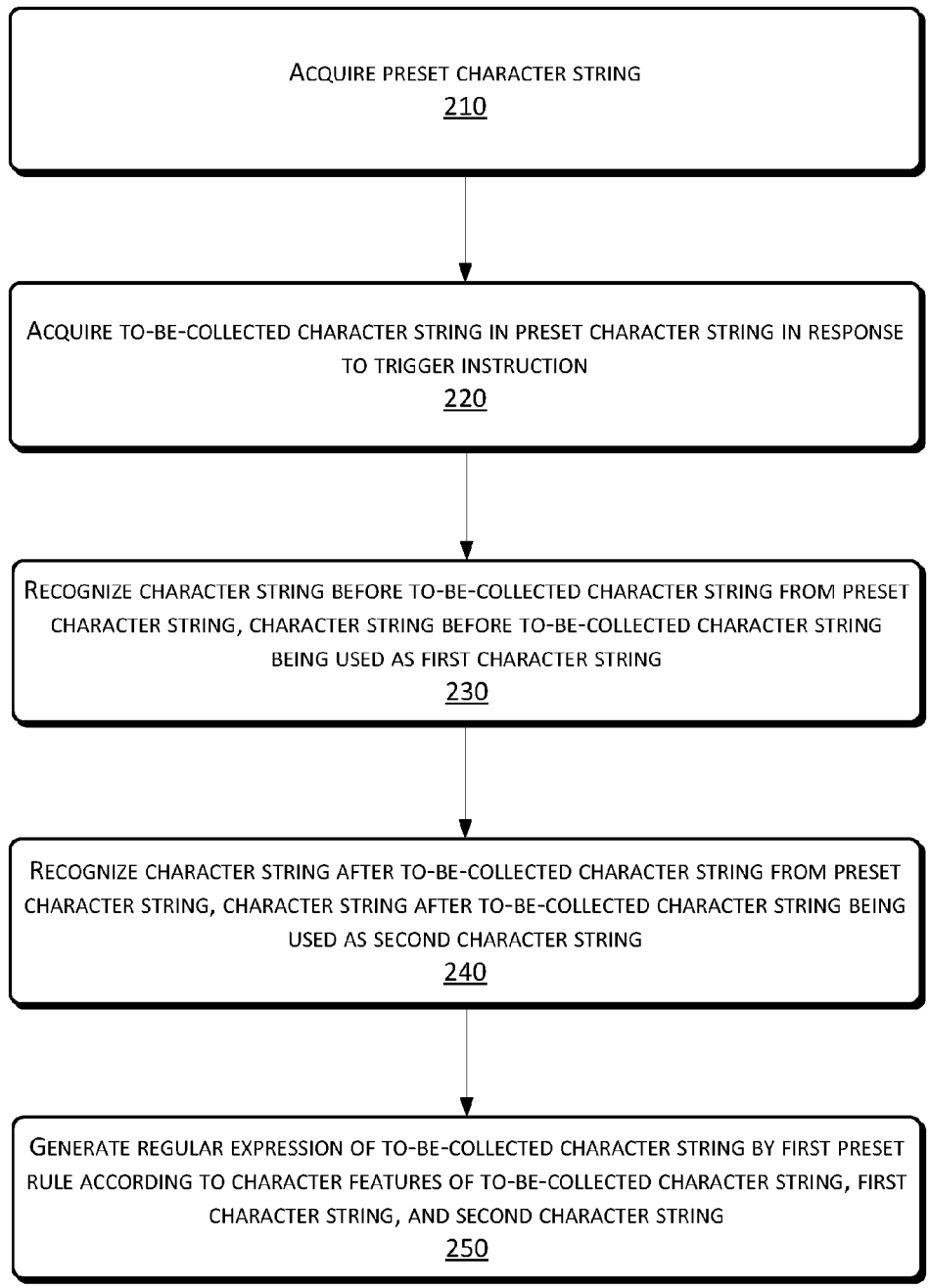
FIG. 2 is a flowchart of an example method for generating a regular expression according to an example embodiment of the present disclosure.

A method for generating a regular expression according to an example embodiment of the present disclosure is firstly introduced below. By reference to FIG. 2, the example embodiment includes:

At 210, a preset character string is acquired.

In the example embodiment of the present disclosure, the preset character string is acquired in response to an operation imported or done by a user. Here the preset character string may be a log, such as:

"[2015-01-07 18:50:36.432] [INFO] access - 127.0.0.1 - - "GET/user/projects/ali-sls-test HTTP/1.1" 304 - "http://localhost:8888/" "Mozilla/5.0 (Macintosh; Intel Mac OS X 10_10_1) AppleWebKit/537.36 (KHTML, like Gecko) Chrome/39.0.2171.95 Safari/537.36""

This is an access log, and the content recorded include information of user access service, such as an IP of a user, a URL (Uniform Resource Locator) requested by the user, and a browser used by the user.

In addition, the preset character string in the example embodiment of the present disclosure may be acquired in response to an operation imported by a user, or in other ways in practice, which is not limited by the example embodiment of the present disclosure.

Further, the preset character string in the example embodiment of the present disclosure may be a log, or in other forms, such as a character string which satisfies a certain syntax, which is not limited by the example embodiment of the present disclosure.

At 220, a to-be-collected character string in the preset character string is acquired in response to a trigger instruction.

In the example embodiment of the present disclosure, the trigger instruction may include a user operation of selecting and dragging a partial character string in the preset character string according to the actual needs; and a first instruction triggered by a user's clicking on a start position of the partial character string in the present character string, and a second instruction triggered by clicking on an end position of the partial character string, wherein the second instruction may include a user operation of pressing a preset shortcut key and clicking on the end position of the partial character string.

In an example of a log, the acquired preset character string is, for instance,

"[2014-11-02 19:46:03.895] [INFO] access - 127.0.0.1 - - "GET/HTTP/1.1" 304 - "OK""

Provided that the character string, which needs to be collected by the user, i.e., the to-be-collected character string, is: "2014-11-02 19:46:03.895", the user operation of selecting and dragging the character string triggers the instruction, and the to-be-collected character string which is recognized from the preset character string according to the trigger instruction is: "2014-11-02 19:46:03.895".

Further, the user may freely select the character string which needs to be collected. However, the character string selected by the user is generally a character string of certain significance. For example, the character string selected by the user may be "INFO" or "IN". However, the former one, i.e., "INFO", has certain meaning and represents a log level, while the later one, i.e., "IN", is of no meaning and even though it is selected, the generated corresponding regular expression is of no meaning either.

In addition, the implementation of the trigger instruction in the example embodiment of the present disclosure may include an operation of selecting and dragging a partial character string in the preset character string or a first instruction of clicking on a start position of the partial character string in the present character string, a second instruction of clicking on an end position of the partial character string in the present character string, or other forms in practice, such as an operation of selecting and right-clicking on an area of the partial character string in the preset character string, which is not limited by the example embodiment of the present disclosure.

At 230, a character string before the to-be-collected character string is recognized from the preset character string, wherein the character string before the to-be-collected character string is used as a first character string.

By using the preset character string "[2014-11-02 19:46: 03.895] [INFO] access - 127.0.0.1 - - "GET/HTTP/1.1" 304 - "OK"" in operation 200 as an example, when the to-be-collected character string is: "2014-11-02 19:46: 03.895", the character string before the to-be-collected character string recognized from the preset character string is: "[", i.e., the first character string is "[".

At 240, a character string after the to-be-collected character string is recognized from the preset character string, wherein the character string after the to-be-collected character string is used as a second character string.

Using the example in 220, the character string after the to-be-collected character string in the preset character string, i.e., the second character string, is: "][INFO] access - 127.0.0.1 - - "GET/HTTP/1.1" 304 - "OK"".

At 250, a regular expression of the to-be-collected character string is generated by a first preset rule according to character features of the to-be-collected character string, the first character string and the second character string.

For example, the first preset rule may include the following:

In order to generate the to-be-collected regular expression here, firstly it is necessary to determine the character features of the first character string and the to-be-collected character string, and then generate a first partial regular expression according to the character features of the first character string and the to-be-collected character string. For example, the first partial regular expression is determined in operations from the first step to the third step as follows:

At the first step, when the first character string satisfies a second preset rule, a corresponding result is returned and used as the first partial regular expression.

For example, the second preset rule may include the following:

When the first character string is not empty, and the first character string is composed of pure number characters and the to-be-collected character string is empty, or the first character of the to-be-collected character string is not a pure number character; a first preset identifier is returned.

The first preset identifier is "\\d+", which indicates that the first character string is composed of numbers.

When the first character string is not empty, and the first character string is composed of pure word characters including letters and the to-be-collected character string is empty, or the first character of the to-be-collected character string is not a pure word character, a second preset identifier is returned.

The second preset identifier is "\\w+", which indicates that the first character string is composed of word characters.

Further, the pure word characters include a-z, A-Z and 0-9.

When the first character string is not empty, and the first character string is composed of non-empty characters, and the to-be-collected character string is an empty character string or the first character of the to-be-collected character string is an empty character; a third preset identifier is returned.

The third preset identifier is "\\S+", which indicates that the first character string is composed of non-empty characters.

Further, the empty character here includes: space, "\t", "\n", "\r", "\v"" and "\f", wherein "\t" is an escape character and represents horizontal tab; "\n" is an escape character and represents line change; "\r" is an escape character and represents enter; "\v" is an escape character and represents vertical table; and "\f" is an escape character and represents page change. Therefore, as long as the characters are not space, "\t", "\n", "\r", "\v"" and "\f," such characters are non-empty characters.

When the first character string is empty; a fourth preset identifier is returned.

The fourth preset identifier is " ", which indicates that the first character string is empty.

Further, when the first character string does not satisfy the second present rule, the character feature of the to-be-collected character string is determined.

At the second step, when the to-be-collected character string satisfies a third preset rule, a corresponding result is returned and used as the first partial regular expression.

For example, the third preset rule may include:

When the to-be-collected character string is not empty, and the first character of the to-be-collected character string is a separator, and the first character string does not include the first character of the to-be-collected character string, a fifth preset identifier is returned.

For example, the separator includes " "(space), "[" (square bracket), "]" (square bracket), "\"" (double quotation mark), "-" (hyphen), "\t" (Tab), ":" (colon), "," (comma) and ";" (semicolon).

Further, the fifth preset identifier may include, for example, "["+ the first character of to-be-collected character string +"]+", which indicates that the to-be-collected character string is not empty, the first character of the to-be-collected character string is a separator, and the first character string does not include the first character of the to-be-collected character string.

When the to-be-collected character string is empty, a sixth preset identifier is returned.

For example, the sixth preset identifier may include ".*", which indicates that the to-be-collected character string is empty.

Further, when the to-be-collected character string does not satisfy the third preset rule, the character feature of the first character string is further determined.

At the third step: when the first character string satisfies a fourth preset rule, a corresponding result is returned and used as the first partial regular expression.

For example, the fourth preset rule may include the following:

A first preset variable is defined. Characters in the first character string are sequentially traversed. Whether the characters in the first character string are separators or not is determined.

When the determining result is yes, the characters are appended to the first preset variable.

For example, the defined first preset variable is res1=" ", provided that the first character string is "-", i.e., the character in the first character string is a separator when the first character string is traversed, after the character is appended to the first preset variable, res1="-".

For example, space, "\t" (Tab) need to be escaped to become "\\s"; "[" (square bracket) needs to be escaped to become "\\["; "\"" (double quotation mark) needs to be escaped to become "\\\""; other separators may be directly appended to the first preset variable.

For example, the defined first preset variable is res1=" ", supposing that the first character string is "-[", i.e., the character in the first character string is a separator when the first character string is traversed, after the character is appended to the first preset variable, res1="-\\s\\[".

When the determining result is no, the traversing is stopped.

Whether the characters in the first character string are all traversed or not is determined.

When the characters in the first character string are all traversed, the first preset variable is returned.

The current first preset variable is used as the first partial regular expression.

When the characters in the first character string are not all traversed, and when the character string which is not traversed does not include separators, the character string which is not traversed in the first character string is acquired, and operation at the first step is called. The character string which is not traversed in the first character string is used as the first character string.

Further, when the current first character string satisfies the second preset rule, the returned result is appended to the first preset variable, and the first preset variable is returned.

Further, when the current first character string satisfies the fourth preset rule, the returned result is appended to the first preset variable, and the first preset variable is returned.

Further, when the characters in the first character string are not all traversed, and when the character string which is not traversed includes separators, the character string which is not traversed in the first character string is acquired.

According to the first separator in the character string which is not traversed, the character string which is not traversed is separated into a character string before the first separator, the first separator and a character string after the first separator.

Further, the character string before the first separator is used as the first character string, operation at the first step is called. When the current first character string satisfies the second preset rule, the returned result is appended to the first preset variable.

Further, when the current first character string does not satisfy the second preset rule, the first separator is used as the to-be-collected character string, operation at the second step is called. When the current to-be-collected character string satisfies the third preset rule, the returned result is appended to the first preset variable.

When the current to-be-collected character string does not satisfy the third preset rule, whether the first character string satisfies the fourth preset rule or not is determined. When the determining result is yes, the returned result is appended to the first preset variable.

Further, the first separator is used as the first character string, operation at the first step is called. When the current first character string satisfies the second preset rule, the returned result is appended to the first preset variable, and the first preset variable is returned.

Further, the character string after the first separator is used as the to-be-collected character string, operation at the second step is called. When the current to-be-collected character string satisfies the third preset rule, the returned result is appended to the first preset variable, and the first preset variable is returned.

Further, the first separator is used as the first character string. When the current first character string satisfies the fourth preset rule, the returned result is appended to the first preset variable, and the first preset variable is returned.

Further, the first preset rule may further include:

determining character features of the to-be-collected character string and the second character string, and generating a second partial regular expression according to the character features of the to-be-collected character string and the second character string; using the to-be-collected character string as the first character string in the operation of determining the first partial regular expression, using the second character string as the to-be-collected character string in the operation of determining the first partial regular expression, and executing the above operations, using the returned result as the second partial regular expression, which may include:

At the fourth step, the to-be-collected character string is used as the first character string, operation at the first step is called. When the current first character string satisfies the second preset rule, the result is returned as the second partial regular expression.

Further, the first preset rule may include:

At the fifth step, the second character string is used as the to-be-collected character string, the operation at the second step is called. When the current to-be-collected character string satisfies the third preset rule, the result is returned as the second partial regular expression.

Further, the first preset rule may include:

At the sixth step, the to-be-collected character string is used as the first character string, operation at the third step is called. When the current first character string satisfies the fourth preset rule, the result is returned as the second partial regular expression.

Further, the first preset rule may include:

At the seventh step, the to-be-collected regular expression is generated according to the first partial regular expression and the second partial regular expression.

Here, in case for generating the to-be-collected regular expression according to the first partial regular expression and the second partial regular expression, whether the second partial regular expression is ended with the fifth present identifier (".*") or not needs to be determined first.

When the determining result is yes, the first partial regular expression and the second partial regular expression are combined by a certain or preset rule to generate the regular expression of the to-be-collected character string.

Supposing that the first partial regular expression is: reg1 and the second partial regular expression is: reg2, the regular expression of the to-be-collected character string is: reg1+"("+reg2+")".

When the determining result is no, the first partial regular expression, the second partial regular expression and the fifth preset identifier are combined by a certain or preset rule to generate the regular expression of the to-be-collected character string.

Supposing that the first partial regular expression is: reg1 and the second partial regular expression is: reg2, the regular expression of the to-be-collected character string is: reg1+"("+reg2+")"+.*.

Further, the regular expression is generally ended with the fifth preset identifier (".*"), wherein "." indicates any character, "*" indicates 0 or multiple, and ".*" indicates matching with arbitrary multiple characters or no character. Since the generated regular expression of the to-be-collected character string does not need to include the features of the remaining characters, it is ended with ".*".

It is noted that the operations or steps for generating the regular expression actually is not strictly based on the above order. The operations or steps such as those from the first step to the third step may be executed concurrently and independently.

The method for acquiring the regular expression is described below in detail by the above example.

The to-be-collected character string is: "2014-11-02 19:46:03.895", the first character string is: "[" and then the second character string is: "] [INFO] access - 127.0.0.1 - - "GET/HTTP/1.1" 304 - "OK"".

Firstly, the first character string "[" is determined. The first character string "[" does not satisfy the second preset rule in the first step. Go to the second step, the to-be-collected character string "2014-11-02 19:46:03.895" is determined. The to-be-collected character string "2014-11-02 19:46:03.895" does not satisfy the third preset rule in the second step. Go to the third step, the characters in the first character string "[" are sequentially traversed. Whether the characters in the first character string are separators or not is determined. "[" is a separator and needs to be escaped. Thus, "\\[" is returned and used as the first partial regular expression.

Then, the to-be-collected character string "2014-11-02 19:46:03.895" is used as the first character string in the operation of determining the first partial regular expression, the second character string "] [INFO] access - 127.0.0.1 - - "GET/HTTP/1.1" 304 - "OK"" is used as the to-be-collected character string in the operation of determining the first partial regular expression, and the above operations are executed. Firstly, the character string "2014-11-02 19:46:03.895" is determined. The character string "2014-11-02 19:46:03.895" does not satisfy the second preset rule in the first step. Go to the second step, the character string "] [INFO] access - 127.0.0.1 - - "GET/HTTP/1.1" 304 - "OK"" is determined. The character string satisfies the third preset rule in the second step that the to-be-collected character string is not empty, the first character of the to-be-collected character string is a separator, and the first character string does not include the first character of the to-be-collected character string. That is, the first character "]" of the character string is a separator, and the character string "2014-11-02 19:46:03.895" does not include the first character "]" of the character string "] [INFO] access - 127.0.0.1 - - "GET/HTTP/1.1" 304 - "OK"", "[^]]+" is returned as the second partial regular expression.

Since the second partial regular expression is: "[^]]+", which is not ended with the fifth preset identifier "(.*)", when the character string which needs to be collected by the user is: "2014-11-02 19:46:03.895", the finally generated regular expression is: "\\[([^]]+).*".

Further, when the user needs to acquire the regular expression of the entire input log, by sequentially selecting character strings of certain or preset significance or meaning, finally the regular expressions of all the selected character strings are combined by a certain rule.

In case of the log "[2014-11-02 19:46:03.895] [INFO] access - 127.0.0.1 - - "GET/HTTP/1.1" 304 - "OK"", the following operations may be performed.

Firstly, "2014-11-02 19:46:03.895" is selected. The first character string is: "[". The to-be-collected character string is: "2014-11-02 19:46:03.895". The second character string is: "] [INFO] access - 127.0.0.1 - - "GET/HTTP/1.1" 304 - "OK"". Thus, the returned result is "\\[([^]]+).*".

Then, "INFO" is selected. The first character string is: "][". The to-be-collected character string is: "INFO". The second character string is: "] access - 127.0.0.1 - - "GET/HTTP/1.1" 304 - "OK"". Thus, the returned result is "]\\s\\[(\\w+).*".

Then, "access" is selected. The first character string is: "]". The to-be-collected character string is: "access". The second character string is: " - 127.0.0.1 - - "GET/HTTP/1.1" 304 - "OK"". Thus, the returned result is "]\\s(\\w+).*".

Then, "127.0.0.1" is selected. The first character string is: "-". The to-be-collected character string is: "127.0.0.1". The second character string is: "- - "GET/HTTP/1.1" 304 - "OK"". Thus, the returned result is "\\s-\\s(\\S+).*".

Then, "GET/HTTP/1.1" is selected. The first character string is: "- - "". The to-be-collected character string is: "GET/HTTP/1.1". The second character string is: "" 304 - "OK"". Thus, the returned result is "\\s-\\s-\\s\"([^\"]+).*".

Then, "304" is selected. The first character string is: "" ". The to-be-collected character string is: "304". The second character string is: " - "OK"". Thus, the returned result is "\"\\s(\\d+).*".

Then, "OK" is selected. The first character string is: " - "". The to-be-collected character string is: "OK". The second character string is: """. Thus, the returned result is "\\s-\\s\"(\\w+).*".

Finally, the above returned results are combined. ".*" at the end of the returned results except the finally returned result is removed, and the escaped characters are restored to acquire the final regular expression:
\[([^]]+)\d+]\s\[(\w+)]\s(\w+)\w+\s−\s(\s+)\s−\s−\s "([^"]+)\d+"\s(\d+)\s−\s"(\w+).*

Further, when acquiring a regular expression of more than one character string of certain or preset significance or meaning, upon selection of the character string before the to-be-collected character string, the character string before the to-be-collected character string is selected, but the character string which has been selected and the character string before the selected character string need to be removed.

Accordingly, the technical solution in the example embodiment of the present disclosure acquire the to-be-collected character string in the preset character string in response to the trigger instruction according to the needs of the user, and generate the regular expression of the to-be-collected character string according to the preset rule, which, compared with the conventional techniques, improves the flexibility in usage greatly, and generates the regular expressions of the corresponding character strings according to the needs of the user to parse the character strings which are useful to the user according to the regular expressions.

Figure 3:
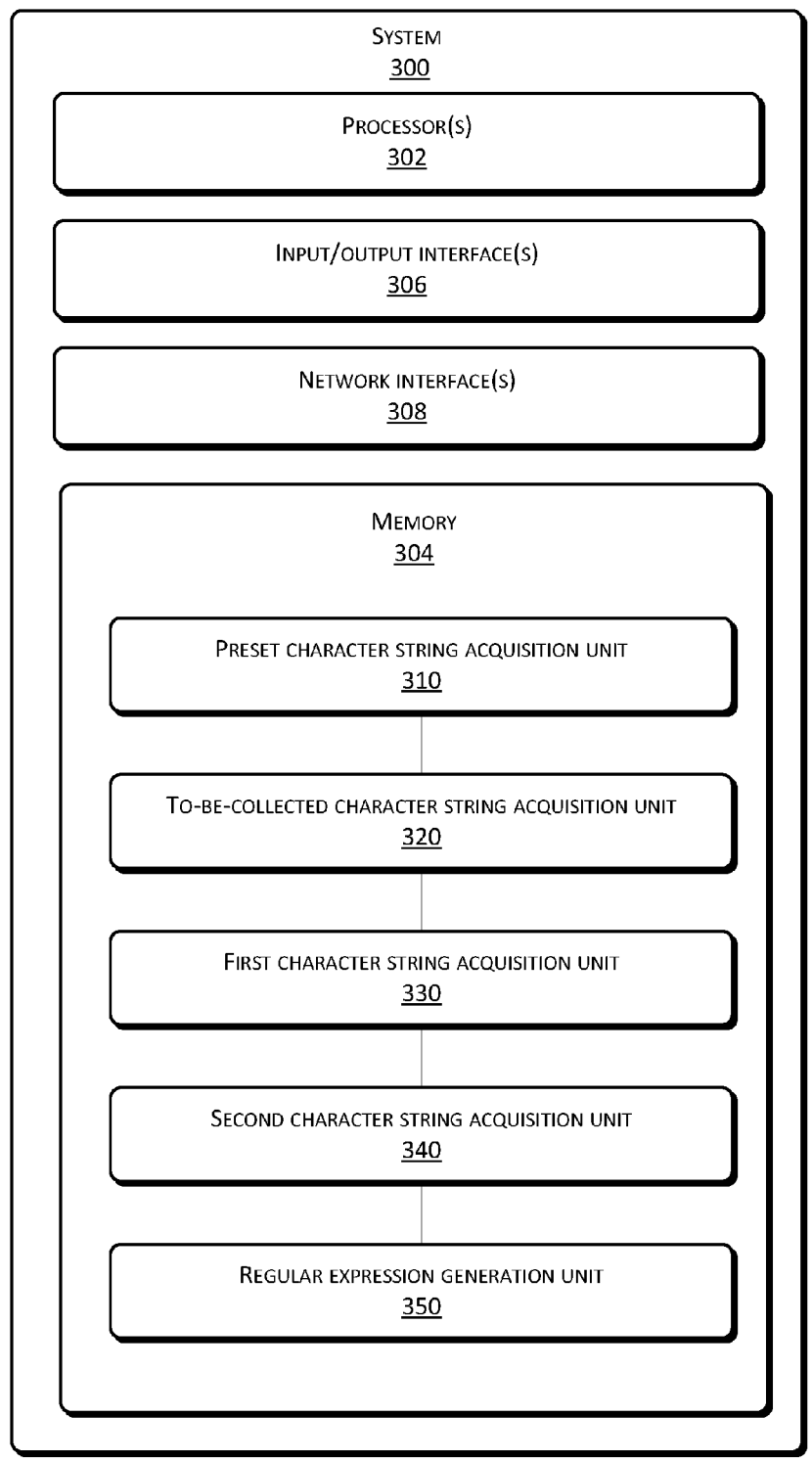
FIG. 3 is a flowchart of an example system for generating a regular expression according to an example embodiment of the present disclosure.

The example embodiment of a system for generating a regular expression of the present disclosure is introduced below. By reference to FIG. 3, a system 300 includes one or more processor(s) 302 or data processing unit(s) and memory 304. The system 300 may further include one or more input/output interface(s) 306, and network interface(s) 308. The memory 304 is an example of computer-readable media.

The memory 304 may store therein a plurality of modules or units including:

a preset character string acquisition unit 310 that acquires a preset character string;

a to-be-collected character string acquisition unit 320 that acquires a to-be-collected character string in the preset character string in response to a trigger instruction;

a first character string acquisition unit 330 that recognizes a character string before the to-be-collected character string from the preset character string, the character string before the to-be-collected character string being used as a first character string;

a second character string acquisition unit 340 that recognizes a character string after the to-be-collected character string from the preset character string, the character string after the to-be-collected character string being used as a second character string; and a regular expression generation unit 350 that generates a regular expression of the to-be-collected character string by a first preset rule according to character features of the to-be-collected character string, the first character string and the second character string.

In an example embodiment, the to-be-collected character string acquisition unit 320 includes:

a first operation module that, in response to an operation instruction of selecting and dragging a partial character string in the preset character string, acquires the to-be-collected character string;

a second operation module that, in response to a first instruction of clicking on a start position of the partial character string in the present character string and in response to a second instruction of clicking on an end position of the partial character string in the present character string, acquires the to-be-collected character string; or a third operation module that, in response to an operation instruction of selecting and right-clicking on an area of the partial character string in the preset character string, acquiring the to-be-collected character string.

Accordingly, the method and system for generating the regular expression in the example embodiment of the present disclosure acquire the to-be-collected character string in the preset character string in response to the trigger instruction according to the needs of the users, and generate the regular expression of the to-be-collected character string according to the preset rule, which, compared with the conventional techniques, improves the flexibility in usage greatly, and generates the regular expressions of the corresponding character strings according to the needs of the user to parse the character strings which are useful to the user according to the regular expressions.

In the 1990s, whether a technical improvement is a hardware improvement (for example, an improvement on a circuit structure such as a diode, a transistor, a switch, etc.) or a software improvement (an improvement on a method and process) may be differentiated clearly. However, along with the development of technologies, an improvement on a method or process nowadays may be regarded as a direct improvement on a hardware circuit structure. Almost all the designers program an improved method or process into a hardware circuit to obtain a corresponding hardware circuit structure. Therefore, one of ordinary skill in the art cannot say that an improvement on a method and process cannot be implemented by a hardware entity module. For example, a Programmable Logic Device (PLD) (such as a Field Programmable Gate Array (FPGA)) is such an integrated circuit whose logic function is determined by user's programming. The designers may program by themselves to "integrate" a digital system with a PLD, and there is no need to ask a chip manufacturer to design and manufacture an application-specific integrated circuit chip. Furthermore, instead of manually producing an integrated circuit chip, such programming is often implemented by "logic compiler" software, which is similar to a software compiler used for program development and coding, and before compiling, original codes may also be written in a particular programming language, which is referred to as a Hardware Description Language (HDL). There is not only one type of HDL but also a plurality of types of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language) and the like, among which VHDL (Very-High-Speed Integrated Circuit Hardware Description Language) and Verilog2 are most commonly used nowadays. Those skilled in the art also understand that a hardware circuit for implementing a logic method and process may be easily obtained by programming such a method and process into an integrated circuit with a logical programming and above hardware description languages.

A controller may be implemented in any suitable manner. For example, the controller may use the form of a microprocessor or processor and a computer-readable medium that stores computer-executable instructions (e.g., software or firmware) executable by the (micro)processor, logic gates, switches, an Application Specific Integrated Circuit (ASIC), a programmable logic controller, and an embedded microcontroller. The examples of controllers include, but not limited to: ARC 625D, Atmel AT91SAM, Microchip PIC18F26K20, and Silicon Labs C8051F320. The memory controller may also be implemented as part of the memory control logic.

Those skilled in the art also know that, in addition to implementing a controller by computer-executable instructions, with a logic programming of method or steps, the controller may realize the same function in the form of such as a logic gate, a switch, an application specific integrated circuit, a programmable logic controller, or an embedded microcontroller. Therefore, such a controller may be regarded as a hardware component, and its apparatus for realizing various functions may be regarded as an internal structure of the hardware component. The apparatus for realizing various functions may even be regarded either as a software module for realizing a method or an internal structure of a hardware component.

Specifically, the system, apparatus, module or unit illustrated in the above example embodiment may be implemented by a computer chip or an entity, or a product with a certain function.

For the sake of convenient description, the above apparatuses are functionally divided into various units which are separately described. Certainly, when implementing the present disclosure, the functions of various units may be implemented in one or more instances of software and/or hardware.

By the preceding description of the example embodiments, persons skilled in the art clearly understand that the present disclosure may be implemented via software plus the necessary general hardware platform. Based on such understanding, the substance of the technical solution of the present disclosure, or the portion of the application that makes contribution to the state of the art, may be embodied in the form of a software product. In a typical configuration, the computer device includes one or more central processing units (CPUs), I/O interfaces, network interfaces, and an internal memory. The computer software product contains plural instructions enabling a computer device (which can be a personal computer, a server, a network device, and so on) to execute the methods recited in the example embodiments or part of the example embodiments of the present disclosure.

The computer software product is stored in the memory that may include a volatile memory, a Random Access Memory (RAM), and/or non-volatile memory, e.g., Read-Only Memory (ROM) or flash RAM, and so on in the computer readable media. The internal memory is an example of computer readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The example embodiments in this specification are described in a progressive manner, and for identical or similar parts between different example embodiments, reference may be made to each other so that each of the example embodiments focuses on differences from other example embodiments. Especially, the system example embodiment is described relatively simply because it is substantially similar to the method example embodiments, and for related parts, reference may be made to the method example embodiments.

The present disclosure may be used in an environment or in a configuration of universal or specialized computer systems. Examples include: a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described in a general context of computer-executable instructions executed by a computer, such as a program module. Generally, a program module includes routines, programs, objects, modules, and data structure, etc., for executing particular tasks or implementing particular abstract data types. The application may also be implemented in a distributed computing environment. In the distributed computing environment, a task is executed by remote processing devices which are connected through a communication network. In distributed computing environment, the program module may be located in storage media (which include storage devices) of local and remote computers.

Although the present disclosure is described with the above example embodiments, it is appreciated that one of ordinary skill in the art may alter or modify the present disclosure in many ways without departing from the spirit of the application. These modifications and variations should be considered to be included in the appended claims without departing from the spirit of the present disclosure.

What is claimed is:

1. A method comprising:
    acquiring a preset character string;
    acquiring a to-be-collected character string in the preset character string in response to a trigger instruction;
    recognizing a character string before the to-be-collected character string from the preset character string, the character string before the to-be-collected character string being used as a first character string;
    recognizing a character string after the to-be-collected character string from the preset character string, the character string after the to-be-collected character string being used as a second character string; and
    generating a regular expression of the to-be-collected character string by a first preset rule according to character features of the to-be-collected character string, the first character string, and the second character string.

2. The method of claim 1, wherein the first preset rule includes:
    returning a corresponding result and using the corresponding result as a first partial regular expression when the first character string satisfies a second preset rule.

3. The method of claim 2, wherein the second preset rule includes:
    returning a first preset identifier when the first character string is not empty, the first character string is composed of numbers, and the to-be-collected character string is empty.

4. The method of claim 2, wherein the second preset rule includes:
    returning a first preset identifier when the first character string is not empty, the first character string is composed of numbers, and the first character of the to-be-collected character string is not a number.

5. The method of claim 2, wherein the second preset rule includes:
    returning a second preset identifier when the first character string is not empty, the first character string is composed of word characters including letters, and the to-be-collected character string is empty, or the first character of the to-be-collected character string is not a word character.

6. The method of claim 2, wherein the second preset rule includes:
    returning a third preset identifier when the first character string is not empty, the first character string is composed of non-empty characters, and the to-be-collected character string is an empty character string, or the first character of the to-be-collected character string is an empty character.

7. The method of claim 2, wherein the second preset rule includes:
    returning a fourth preset identifier when the first character string is empty.

8. The method of claim 1, wherein the first preset rule includes:
    returning a corresponding result and using the corresponding result as a first partial regular expression when the to-be-collected character string satisfies a third preset rule.

9. The method of claim 8, wherein the third preset rule includes:
    returning a fifth preset identifier when the to-be-collected character string is not empty, the first character of the to-be-collected character string is a separator, and the first character string does not include a first character of the to-be-collected character string.

10. The method of claim 8, wherein the third preset rule includes:

returning a sixth preset identifier when the to-be-collected character string is empty.

11. The method of claim 1, wherein the first preset rule includes:
  returning a corresponding result and using the corresponding result as a first partial regular expression when the first character string satisfies a fourth preset rule.

12. The method of claim 11, wherein the fourth preset rule includes:
  defining a first preset variable;
  sequentially traversing characters in the first character string;
  determining whether a respective character in the first character string is a separator;
  appending the respective character to the first preset variable in response to determining that the respective character is the separator.

13. The method of claim 12, wherein, when all characters in the first character string are traversed, the fourth preset rule further includes returning the first preset variable.

14. The method of claim 12, wherein, when the characters in the first character string are not all traversed, and a character string which is not traversed does not include the separators, the fourth preset rule further includes:
  acquiring the character string which is not traversed in the first character string, and using the character string which is not traversed in the first character string as the first character string.

15. The method of claim 14, further comprising:
  appending the returned result to the first preset variable, and returning the first preset variable when the first character string satisfies the second preset rule.

16. The method of claim 14, further comprising:
  appending the returned result to the first preset variable, and returning the first preset variable when the first character string satisfies the fourth preset rule.

17. The method of claim 12, wherein, when the characters in the first character string are not all traversed, and a character string which is not traversed includes a separator, the fourth preset rule further includes:
  acquiring the character string which is not traversed in the first character string; and
  separating the character string which is not traversed into a character string before a first separator, the first separator and a character string after the first separator according to the first separator in the character string which is not traversed.

18. The method of claim 17, wherein the character string before the first separator is used as the first character string, and when the first character string satisfies the second preset rule, the returned result is appended to the first preset variable.

19. A system comprising:
  a preset character string acquisition unit that acquires a preset character string;
  a to-be-collected character string acquisition unit that acquires a to-be-collected character string in the preset character string in response to a trigger instruction;
  a first character string acquisition unit that recognizes a character string before the to-be-collected character string from the preset character string, the character string before the to-be-collected character string being used as a first character string;
  a second character string acquisition unit that recognizes a character string after the to-be-collected character string from the preset character string, the character string after the to-be-collected character string being used as a second character string; and
  a regular expression generation unit that generates a regular expression of the to-be-collected character string by a first preset rule according to character features of the to-be-collected character string, the first character string, and the second character string.

20. One or more memories having computer-executable instructions stored thereon, executable by one or more processors, to cause the one or more processors to perform acts comprising:
  acquiring a preset character string;
  acquiring a to-be-collected character string in the preset character string in response to a trigger instruction;
  recognizing a character string before the to-be-collected character string from the preset character string, the character string before the to-be-collected character string being used as a first character string;
  recognizing a character string after the to-be-collected character string from the preset character string, the character string after the to-be-collected character string being used as a second character string; and
  generating a regular expression of the to-be-collected character string by a first preset rule according to character features of the to-be-collected character string, the first character string, and the second character string.

* * * * *